(12) United States Patent
Liu et al.

(10) Patent No.: US 12,477,143 B2
(45) Date of Patent: *Nov. 18, 2025

(54) VIDEO ENCODING/DECODING USING DETECTED PATTERN OF PIXEL INTENSITY DIFFERENCES

(71) Applicant: ATI TECHNOLOGIES ULC, Markham (CA)

(72) Inventors: Haibo Liu, Markham (CA); Ihab Amer, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 107 days.

This patent is subject to a terminal disclaimer.

(21) Appl. No.: 18/493,153

(22) Filed: Oct. 24, 2023

(65) Prior Publication Data

US 2024/0056600 A1 Feb. 15, 2024

Related U.S. Application Data (63) Continuation of application No. 17/215,347, filed on Mar. 29, 2021, now Pat. No. 11,831,900.

(51) Int. Cl.
| | |
|---|---|
| *H04N 19/52* | (2014.01) |
| *H04N 19/136* | (2014.01) |
| *H04N 19/172* | (2014.01) |
| *H04N 19/176* | (2014.01) |
| *H04N 19/182* | (2014.01) |
| *H04N 19/593* | (2014.01) |

(52) U.S. Cl.
CPC .......... *H04N 19/52* (2014.11); *H04N 19/136* (2014.11); *H04N 19/172* (2014.11); *H04N 19/176* (2014.11); *H04N 19/182* (2014.11); *H04N 19/593* (2014.11)

(58) Field of Classification Search
CPC .......................... H04N 19/52; H04N 19/136
See application file for complete search history.

(56) References Cited

U.S. PATENT DOCUMENTS

| | | | |
|---|---|---|---|
| 2007/0171978 A1* | 7/2007 | Chono | H04N 19/61 375/240.18 |
| 2014/0112392 A1 | 4/2014 | Lim et al. | |
| 2017/0251227 A1 | 8/2017 | Dvir et al. | |
| 2018/0160113 A1* | 6/2018 | Jeong | H04N 19/109 |
| 2022/0312029 A1 | 9/2022 | Liu et al. | |

* cited by examiner

*Primary Examiner* — Jerry T Jean Baptiste (57) ABSTRACT

Methods and apparatus encode image frames using intra-frame prediction by predicting pixels for a block of current pixels, based on a detected spatial pattern of pixel intensity differences among a plurality of neighboring reconstructed pixels to the block of current pixels, and encode a block of pixels of the image frame using the predicted block of reconstructed pixels. Inter-frame prediction is provided by determining whether blocks of pixels in temporally neighboring reconstructed frames corresponding to a candidate motion vector have a pattern of pixel intensity differences among the blocks from temporally neighboring frames. Predicted blocks are produced for a reconstructed frame based on the determined pattern of pixel intensity difference among temporally neighboring frames.

18 Claims, 10 Drawing Sheets

FIG. 10

VIDEO ENCODING/DECODING USING DETECTED PATTERN OF PIXEL INTENSITY DIFFERENCES

CROSS-REFERENCE TO RELATED APPLICATIONS

This is a continuation application of and claims priority for patent entitled to a filing date and claiming the benefit of earlier-filed U.S. patent application Ser. No. 17/215,347, filed Mar. 29, 2021. Each patent application cited herein is hereby incorporated by reference in its entirety.

BACKGROUND OF THE DISCLOSURE

Image frames are often compressed through a coding scheme to reduce the amount of data transmitted in video systems. A video codec is a device or firmware/software program that enables video compression and/or decompression for digital video. Certain video, such as gaming applications that use graphics processors to create graphics content employ shading algorithms to apply shading to objects and scenes for a realistic image quality. For example, cloud gaming platforms employ cloud servers that output streams of video gaming content at high resolution and employ video encoders to compress image frames that are then decoded by a decoder in a client device such as a gaming console, laptop, handheld device, high definition television or other suitable decoding device. Also, live video from cameras are also compressed such as when a user employs a camera during a multi-player gaming event. Having proper encoding schemes to allow throughput of high quality content is paramount in the use of cloud platforms.

Prediction techniques are used in video compression systems to enable efficient encoding. In block-based video compression, the closer the predicted block to the original one, the more efficient the encoding is. Contemporary video encoding technologies rely on two main types of prediction, namely intra and inter prediction. In intra prediction, reconstructed left and/or top spatially neighboring lines of pixels are used to predict the original block in different angular modes. On the other hand, in inter prediction, a temporally neighboring reconstructed block of pixels is used to make the prediction. In many cases, the reference pixels and the pixels of the current frame may belong to areas that are shaded differently, and hence it becomes difficult to predict the current from the reference without spending too many bits on residual data.

In regions of video with motion, a number of pixels change from one image frame to the next, and the video compression scheme must send more data to keep up with the larger number of pixels that are changing. In extreme cases of high-frequency detail changes, the video quality may decrease. In order to maintain video quality, yet reduce the amount of data that is transmitted, various different compression techniques have been developed. For example, MPEG-based video compression typically operates on groups of pixels called macroblocks. Macroblocks are compared within a frame (intra) and/or compared from one image frame to the next image frame (inter). For inter-prediction the video compression the codec sends macroblock motion vectors and residual information about differences between the macroblocks. Areas of video that have no motion thus require very little transmitted data.

The temporal prediction technique used in MPEG video, for example, is based on motion estimation. Motion estimation is based on the premise that, in most cases, consecutive image frames will be similar except for changes caused by objects moving within the frames. A motion vector is the key element in the motion estimation process. The motion vector is used to represent a macroblock in a frame based on the position of the macroblock (or a similar one) in another image frame, called the reference frame. The H.264/MPEG-4 AVC standard defines a motion vector as a two-dimensional vector used for inter prediction that provides an offset from the coordinates in the decoded image frame to the coordinates in a reference frame. In general, motion estimation is the process of determining the motion vectors that describe the transformation from one image frame to another image frame, where the image frames are usually adjacent in a video sequence. Motion vectors may relate to the whole image (global motion estimation) or specific parts, such as rectangular blocks or arbitrary shaped patches. The motion vectors may be represented by a translational model or other models that can approximate the motion of a real video recording system.

Applying the motion vectors to an image frame to synthesize the transformation to the next image frame is called motion compensation. The combination of motion estimation and motion compensation is a key part of the video compression method used by many video codecs.

Some systems employ both intraframe prediction and interframe prediction and select a best candidate for use in encoding the macroblock of the image, after a rate distortion optimization (RDO) process is performed. The RDO process is a method for performing a compression quality test on inter-predicted candidates and different angular modes of intra-predicted candidates for blocks of pixels and the best candidate is used to encode a pixel or block of pixels. Where differently shaded objects or sections of a frame occur, having an inferior compression technique can result in poor output image quality at comparable bitrates, or require higher bit rates for comparable image quality that is provided from a decoder.

Some known systems may employ interframe prediction to determine a temporal linear trend among temporal blocks of pixels but require using spatially neighboring pixels to the corresponding temporal block in a single temporal frame and the spatially neighboring pixels to the block being predicted. Such systems may not provide needed accuracy in detecting temporal trends.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Briefly, a method and apparatus process reconstructed pixels, also referred to as reference pixels, within a reconstructed frame or among temporal reconstructed frames and detect patterns of pixel intensity differences among neighboring reconstructed pixels. The detected pattern of pixel intensity differences, also referred to as a shading trend, is then used to extrapolate pixels to predict pixels for blocks of the reconstructed frame. The predicted pixels are then used to encode a block of pixels of an image frame which then may be decoded and displayed or further processed.

In some implementations, the encoder and if desired the decoder, detects patterns of pixel intensity differences from shading differences in graphics content such as in gaming applications and also detects shading differences for video produced by cameras. In certain implementations, a conventional prediction process is augmented to include a process that analyzes the reconstructed pixels (e.g., reference pixels) to detect patterns in pixel intensity differences in reconstructed pixels resulting in predicted reconstructed pixels that represents a better predictor of the current block. In certain implementation, the parameters of the shading model used by a graphics processor to create graphics images for example can be detected based on the trend in neighboring reconstructed pixels and/or it can be signaled in the bitstream to the decoder.

Stated another way, in some implementations, the pattern of pixel intensity differences is an additional process used by an encoder to present candidate reconstructed pixels that are compared with other candidate reconstructed pixels generated by other prediction techniques. In some examples, the encoder chooses the best candidate prediction technique and applies it to a given block. The pattern of pixel intensity differences detection is employed in both intra-prediction operations and/or inter-prediction operations.

In certain implementations, a method in an encoding device for encoding at least one image frame includes providing intra-frame prediction by generating a predicted block from reconstructed pixels for a block of current pixels, based on a detected spatial pattern of pixel intensity differences among a plurality of spatially neighboring reconstructed pixels to the block of current pixels; and encoding the block of current pixels of the image frame using the predicted block of reconstructed pixels.

In some examples, the method provides inter-frame prediction by generating the predicted block from reconstructed pixels for the block of current pixels, based on a detected temporal pattern of pixel intensity differences among temporal blocks of pixels in temporally neighboring reconstructed frames corresponding to a candidate motion vector of the block of current pixels and produces predicted blocks for a reconstructed frame based on the determined pattern of pixel intensity difference among temporally neighboring frames.

In certain examples, the method performs a compression quality test on the intra-predicted reconstruction pixels and inter-prediction reconstructed pixels. Based on the compression quality test, a compression mode is selected that uses at least one of the intra-predicted reconstructed pixels or inter-predicted reconstructed pixel to encode a block of pixels in the frame.

In some examples, the method outputs data for a decoder indicating that an intensity difference pattern prediction operation was used in the encoding process. In certain examples data representing a formula defining the pattern is output for a decoder.

In certain examples, the method performs a best fit curve analysis on differences among the neighboring reconstructed pixels and applies the determined best fit curve to predict pixel intensities for pixels in the predicted block of reconstructed pixels. In some implementations the best fit curve analysis includes detecting linear pixel intensity differences among the plurality of neighboring reconstructed pixels for a plurality of differing angular prediction modes.

In some implementations, an encoding device for encoding at least one image frame includes a block-based predictor that provides intra-frame prediction by generating a predicted block from reconstructed pixels for a block of current pixels, based on a detected spatial pattern of pixel intensity differences among a plurality of neighboring reconstructed pixels to the block of current pixels. The encoding device encodes the block of current pixels of the image frame using the predicted block of reconstructed pixels.

In certain examples, the block-based predictor performs a best fit curve analysis on differences among the neighboring reconstructed pixels and apply the determined best fit curve to predict pixel intensities for pixels in the predicted block of reconstructed pixels.

In some examples, the block-based predictor detects linear pixel intensity differences among the plurality of neighboring reconstructed pixels for a plurality of differing angular prediction modes and apply the detected linear differences to predict pixels for the block of reconstructed pixels.

In certain examples, the block-based predictor includes a compression mode determinator that performs a compression quality test on the predicted reconstruction pixels as compared to predicted pixels from other prediction modes, and based on the compression quality test, selects a compression mode that uses the predicted reconstructed pixels to encode a block of pixels in the frame.

In some examples, the block-based predictor provides inter-frame prediction by generating the predicted block from reconstructed pixels for the block of current pixels, based on a detected temporal pattern of pixel intensity differences among temporal blocks of pixels in temporally neighboring reconstructed frames corresponding to a candidate motion vector of the block of current pixels, and produces predicted blocks for a reconstructed frame based on the determined pattern of pixel intensity difference among temporally neighboring frames. In certain examples, the encoder encodes blocks of the current input frame using the predicted blocks.

In some examples, the block-based predictor includes a compression mode determinator that performs a compression quality test on the intra-predicted reconstruction pixels and inter-prediction reconstructed pixels, and based on the compression quality test, selects a compression mode that uses at least one of the intra-predicted reconstructed pixels or inter-predicted reconstructed pixel to encode a block of pixels in the frame.

In certain examples, the encoder outputs data for a decoder indicating that an intensity difference pattern prediction operation was used in the encoding process.

In some implementations, an apparatus for decoding an encoded image frame includes a block-based decoder that receives a stream of encoded video, and decodes an encoded block of pixels that is encoded using a predicted block of reconstructed pixels that is predicted based on a detected spatial pattern of pixel intensity differences from neighboring reconstructed pixels in a reconstructed frame.

In certain examples, the block-based decoder receives data indicating that a spatial pattern of pixel intensity differences was used to encode the encoded video and decodes the encoded block of pixels based on the data.

In some examples, the block-based decoder performs intra-prediction based decoding by predicting pixels for a decoded block of reconstructed pixels, based on a detected spatial pattern of pixel intensity differences among a plurality of neighboring reconstructed pixels of a reconstructed frame in a spatial direction that is identified by a decoded intra-prediction mode, and outputting the decoded block that includes the predicted pixels.

In certain examples, the decoder performs inter-prediction based decoding by generating a plurality of reconstructed temporally neighboring frames corresponding to a motion vector, determining whether blocks of pixels in the temporally neighboring reconstructed frames corresponding to the motion vector have a pattern of pixel intensity differences among the blocks from temporally neighboring frames, and producing predicted blocks for a reconstructed frame based on the determined pattern of pixel intensity difference among temporally neighboring frames.

In some examples, the block-based decoder performs a best fit curve analysis on differences among the neighboring reconstructed pixels and apply the determined best fit curve to predict pixel intensities for pixels in the predicted block of reconstructed pixels.

In certain examples, the block-based decoder detects linear pixel intensity differences among the plurality of neighboring reconstructed pixels for a plurality of differing angular prediction modes and apply the detected linear differences to predict pixels for the block of reconstructed pixels.

In some examples, the block-based decoder receives data in the encoded video indicating a type of pixel intensity difference pattern that was used to encode data, and uses the indicated type of pixel intensity difference pattern for prediction of pixel data in a reconstructed frame when decoding the encoded video.

Figure 1:
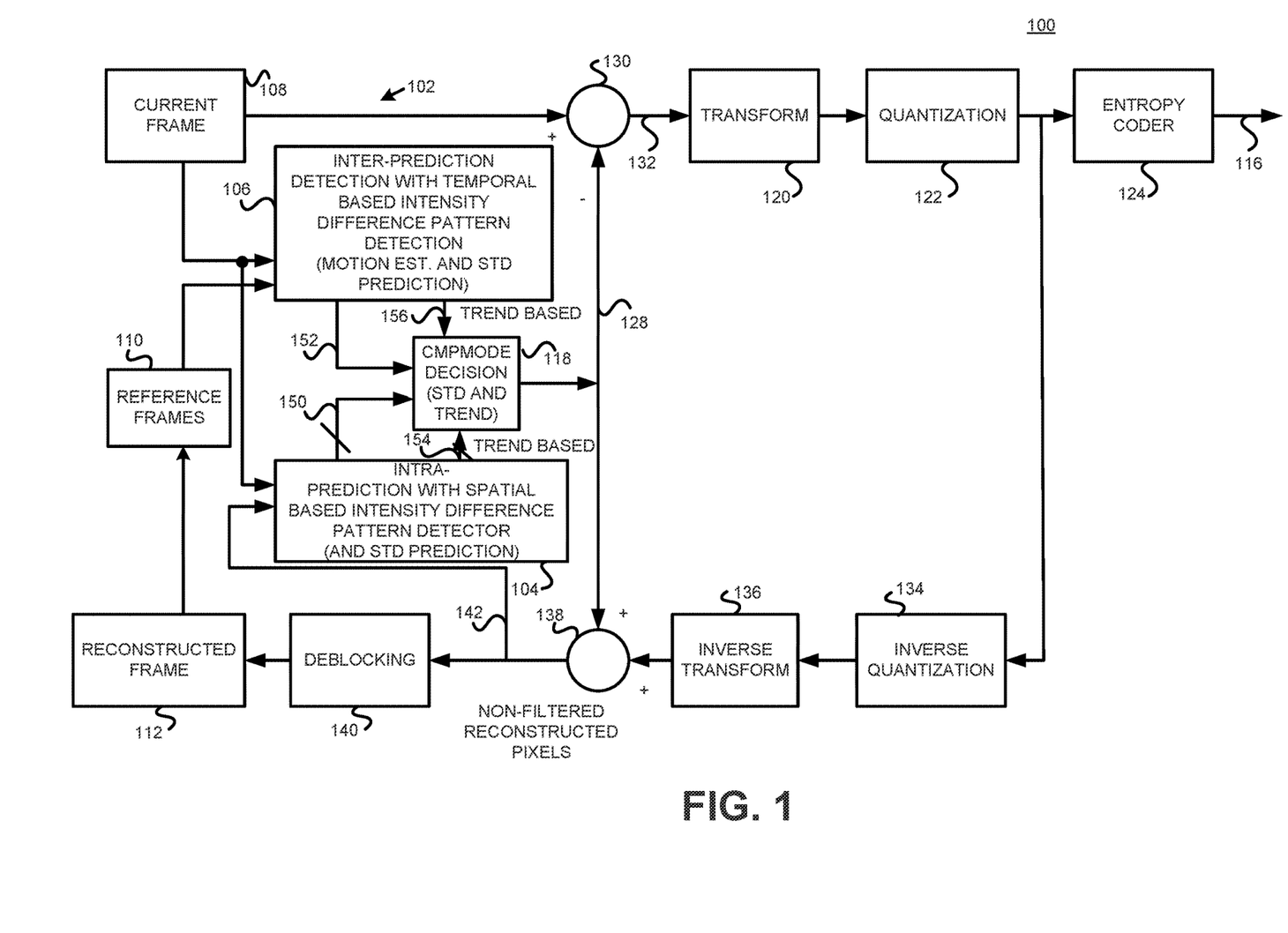
FIG. 1 is a block diagram of an apparatus for encoding one or more images in accordance with one example set forth in the disclosure.

FIG. 1 is a block diagram illustrating one example of an encoding device 100 employing detection of spatial patterns of pixel intensity differences among neighboring reconstructed pixels that are neighboring to a block of current pixels to be predicted. A block-based prediction unit generally shown as 102 has an intra-prediction detector 104 that provides candidate predicted pixels for a block of reconstructed pixels, based on detected spatial patterns of pixel intensity differences among neighboring reconstructed pixels. Inter-prediction detector 106 provides predicted pixels for a block of reconstructed pixels based on detected temporal patterns of pixel intensity differences among neighboring reconstructed pixels that are in neighboring temporal frames. The encoding device 100 includes memory that stores one or more current frames 108, reference frames 110 and reconstructed frames 112. As known in the art, reference frames are a subset of a reconstructed frames. Once a reconstructed frame is generated, it can be used as reference frame if desired but is not always used as such. In this example, the encoding device 102 receives an input image frame such as current frame 108 and encodes the frame through block-based encoding and outputs encoded blocks of pixels 116 as a video stream. The inter-prediction detector 106 serves as a motion estimation unit that receives as input the current frame 108 and/or reconstructed frame 112. The output of the inter-prediction detector 106 and intra-prediction detector 104 are provided to a compression mode determination unit 118 that decides which mode is to be used as the final prediction mode for a given block of pixels to be encoded through a transform stage 120, a quantization stage 122 and entropy encoder 124, as known in the art. The transform stage 120 can be, for example, a forward discrete cosine transform (FDCT) module. The quantization stage 122 can be any suitable quantization unit. The output of the decision module 118 is the predicted block of reconstructed pixels shown as 128. A combiner 130, as known in the art, combines the predicted pixels 128 with a corresponding current pixels from the current frame 108 whose output 132 is provided to the transform stage 120.

The encoding unit also includes an inverse quantization stage 134, an inverse transform stage 136, a combiner 138, a deblocking stage 140 as known in the art. The combiner 138 outputs non-filtered reconstructed pixels 142 which are input to the intra-prediction detector 104. It will be recognized that reconstructed pixels from reconstructed frame 112 or reference frame 110 may also serve as input to the intra-prediction detector 104 as desired. It will be recognized that the encoder device 100 although shown to have both intra-prediction and inter-prediction may be configured to provide either type or both types. For purposes of illustration, the encoder unit 100 will be described as including both intra-prediction and inter-prediction operations.

In some implementations, the intra-prediction detector 104 and inter-prediction detector 106 perform conventional prediction operations such as those compliant with H.264/MPEG 4 standards or any other suitable video encoding standards. For example, in some implementations, the intra-prediction detector 104 performs in-frame angular mode prediction to provide prediction candidates associated with desired angular modes shown as predicted pixels 150. The inter-prediction detector 106 performs inter-prediction among differing frames to provide candidates of predicted pixels 152. Unlike conventional encoders, the encoding unit 102 in some implementations, also produces intra-frame predicted pixels 154 for differing angular modes wherein the intraframe predicted pixels are for blocks of reconstructed pixels that are based on a detected spatial pattern of pixel intensity differences among a plurality of neighboring reconstructed pixels that are neighboring to the block of reconstructed pixels to be predicted. The inter-prediction detector 106 produces predicted blocks of pixels 156 wherein the predicted blocks are for a reconstructed frame and are based on a determined pattern of pixel intensity differences among blocks of temporally neighboring frames.

The inter-prediction detector 106 provides inter-frame prediction by determining whether blocks of pixels in temporally neighboring reconstructed frames that correspond to a given motion vector, have a pattern of pixel intensity differences among the corresponding blocks associated with the motion vectors, where the blocks are from temporally neighboring frames. For example, where a motion vector is associated with an object in a game, such as a tank or airplane that is moving from frame to frame, the motion vector identifies, as known in the art, the amount of movement a block makes from one temporal frame to the next. The inter-prediction detector 106 detects pixel intensity differences and determines if a pattern exists among candidate blocks referred by motion vectors across frames. Interframe trend detection is performed without using spatially adjacent pixels to a current block to be predicted and spatially adjacent pixels to a corresponding block in a temporally adjacent frame. Instead reconstructed pixels of multiple corresponding blocks in multiple temporally associated frames are used to predict the temporal pixel intensity trend. The inter-prediction detector 106 and intra-prediction detector 104 have, in some implementations, programmable registers that are set with pixel intensity thresholds (e.g., luminance thresholds) that have been determined to be at a difference level that is useful for attempting to detect a pattern. It will be recognized however that the encoder may be preset so that any suitable pixel intensity difference will be stored to use as a point value to determine whether a pattern exists.

The compression mode determination unit 118 in some implementations, evaluates candidate predicted pixels and/or blocks 150, 152, 154 and 156 and performs a compression quality test on the differing intra-predicted and inter-predicted pixels to choose a best candidate to use for encoding the current frame (e.g., block in a frame). One example of a compression quality test is an RDO test. In one example, the compression mode determination unit 118 performs a compression quality test on at least the intra-predicted reconstruction pixels 154 and inter-prediction reconstructed pixels 156 and based on the compression quality test, selects a compression mode as the final compression mode and outputs the selected reconstructed pixels that are predicted from a detected spatial or temporal pattern of pixel intensity differences as predicted pixels 128. The predicted pixels 128 are combined (e.g., subtracted) at combiner 130 with original pixels to obtain the residuals which get encoded and sent to the decoder. During decoding, the reconstructed pixels get added to the residuals in the decoder to get reconstructed. In some implementations, the standard generated intra-predicted pixels 150 and standard generated inter-predicted pixels 152 are also considered during mode decision when presented. For some cases, a standard mode gives better predictors than a shading-based mode and will get selected as the best candidate.

Figure 2:
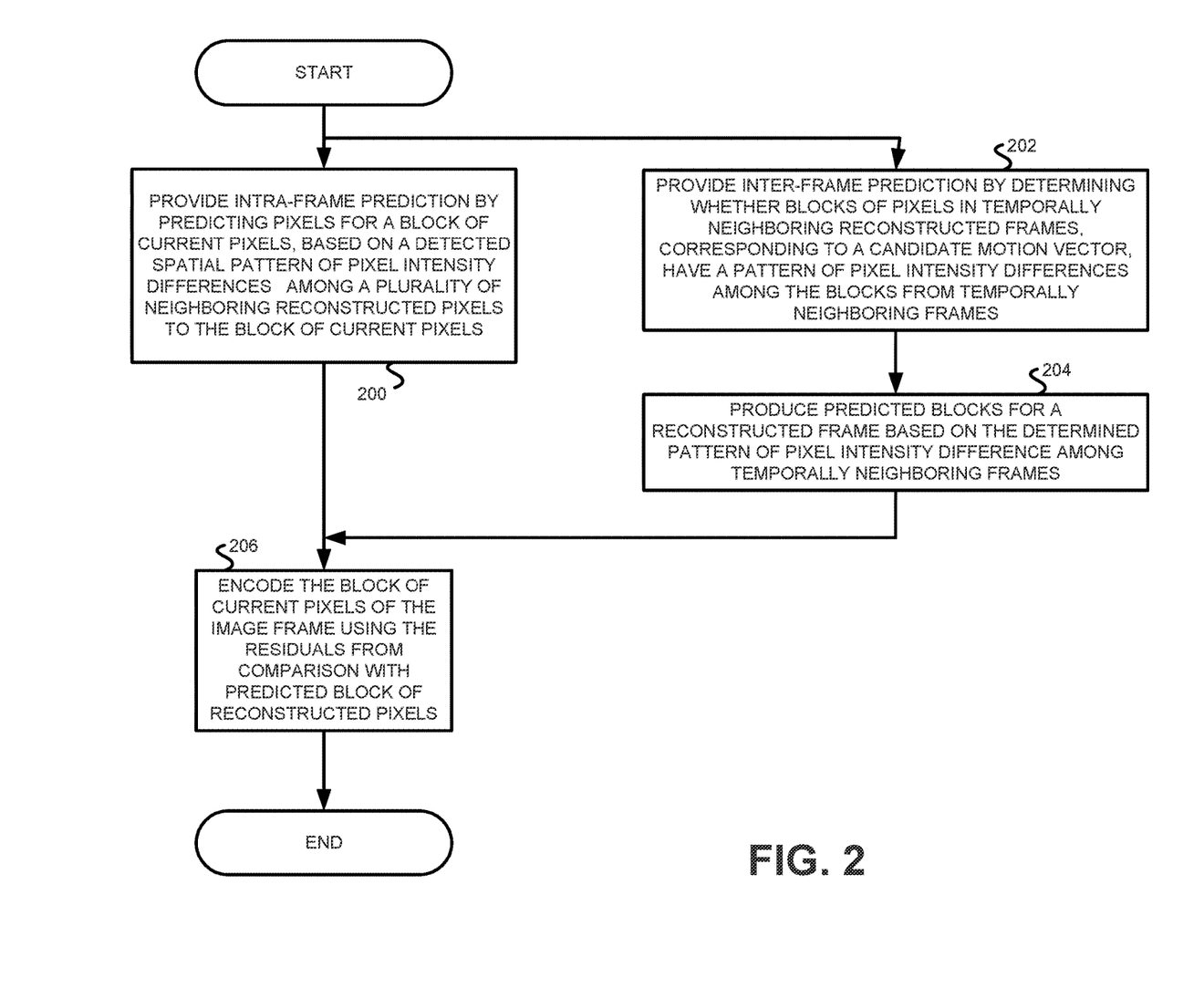
FIG. 2 is a flowchart illustrating a method for encoding one or more images in accordance with one example set forth in the disclosure.

Referring also to FIG. 2, which illustrates a flowchart of a method for encoding an image frame as carried out, for example, by the encoding device 100 of FIG. 1. As shown in block 200, the method includes providing intra-frame prediction by generating a predicted block from reconstructed pixels for a block of current pixels, based on a detected spatial pattern of pixel intensity differences among a plurality of neighboring reconstructed pixels to the block of current pixels. This is carried out, for example, by the intra-prediction detector 104. The predicted pixels that are based on detected spatial pattern of pixel intensity differences is shown as predicted pixels 154.

As shown in block 202, the method includes providing inter-frame prediction by determining whether blocks of pixels in temporally neighboring reconstructed frames that correspond to a candidate motion vector, have a pattern of pixel intensity differences among the blocks from temporally neighboring frames. This is carried out, for example, by the inter-prediction detector 106. The method includes as shown in block 204, producing predicted blocks 156 based on the determined pattern of pixel intensity difference among temporally neighboring frames. As shown in block 206, the method includes encoding a block of pixels of the image frame using the predicted block of reconstructed pixels 154 or 156 depending upon whether or not the mode decision 118 chooses an intra-predicted block as a best candidate or an inter-prediction block as a best candidate.

The spatial pattern of pixel intensity differences in one example are detected by performing a best fit curve analysis on differences among neighboring reconstructed pixels and apply the determined best fit curve to predict pixel intensities for pixels for a predicted block of reconstructed pixels. One example of a best fit curve is the detection of a linear pixel intensity differences among neighboring reconstructed pixels whether the reconstructed pixels are neighboring within the frame or among temporally neighboring frames. In one example, the linear pixel intensity differences are detected for differing angular prediction modes. The detected linear differences are applied to predict pixels for the block of reconstructed pixels. Also, in some implementations, a set of typical pre-determined models is examined until one of them is identified as a good prediction. In some cases, such as synthesized graphics content, the shading model can be passed by the application to the encoder.

Figure 3:
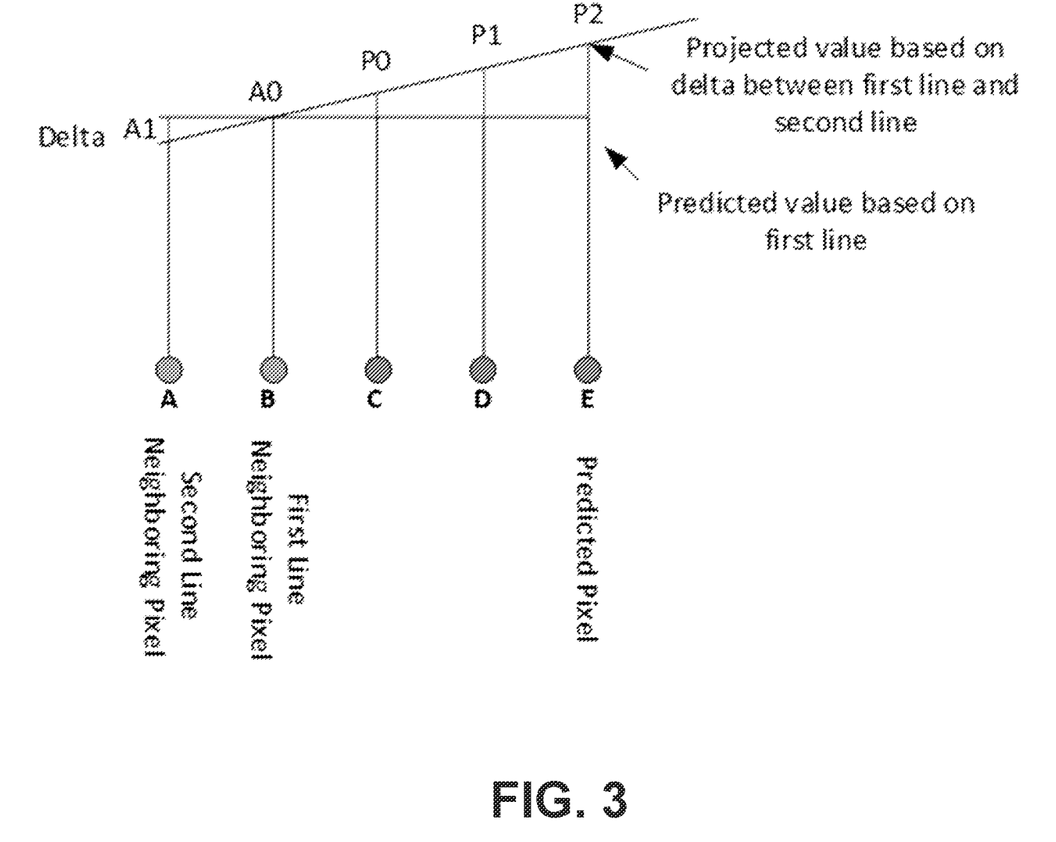
FIG. 3 is a diagrammatic illustration of predicting pixels for a block of reconstructed pixels based on a detected spatial pattern of pixel intensity differences in accordance with one example set forth in the disclosure.

FIG. 3 illustrates diagrammatically an implementation where a detected spatial pattern of pixel intensity differences is detected to be a linear pattern. This example illustrates the intra-prediction detector 104 that provides spatial based intensity pattern detection. Although the example shown is a best fit curve for a linear relationship, it will be recognized that best fit curve analysis that analyzes differences among neighboring reconstructed pixels such as non-linear relationships and any other suitable patterns may be employed to allow prediction of reconstructed pixels to encode a block of pixels in a frame.

In this example, a two-dimensional angle is being assessed to generate the predicted reconstructed pixel values during intra prediction, n lines of neighboring pixels will be used to detect the suitable shading process (if any). For instance, if an almost linear increase in pixel intensity is detected between neighboring pixels along the same angle, such linear increase is applied while generating the predicted pixels.

For example, assuming n=2. If pixels CDE are to be horizontally predicted from pixel B in the classical way, they will all get the pixel value of B (i.e., A0). However, the encoder uses a different approach where reconstructed pixels A and B are used to detect a trend in pixel intensity differences between the pixels in the horizontal direction (e.g., linear increase based on the delta A0-A1), in which case, the same trend is followed to predict pixels CDE whose values continue increasing linearly leading to pixel values (P0, P1, and P2) respectively.

In the case for inter-prediction, while assessing a candidate motion vector, blocks in reconstructed frames that represent the trajectory of the motion are inspected to see if there is a shading trend. If a trend is detected among blocks in temporally neighboring frames, a formula defining the trend is applied during the inter-prediction process to come up with a better-predicted block. For example, instead of pixels being used in FIG. 3, the detector 106 uses blocks of pixels. So A and B will be the temporal neighboring block of pixels and C will be the current block of pixels. The trend can be formulated as scaling and/or offsetting operation. For example, where a linear trend y is defined as y=aX+b, a is scaling factor and b is the offset. In some implementations, non-linear trends are detected. The shading operation can be implicit (self-derived) as the shown in the intra prediction example above, or it can be explicitly defined with shading parameters provided and signaled into the bitstream (e.g., a flag at the block level). For example, for a fitting curve, a X3+b X2+cX+d, then a, b, c, d will be the parameters sent in the bit stream to the decoder.

Figure 10:
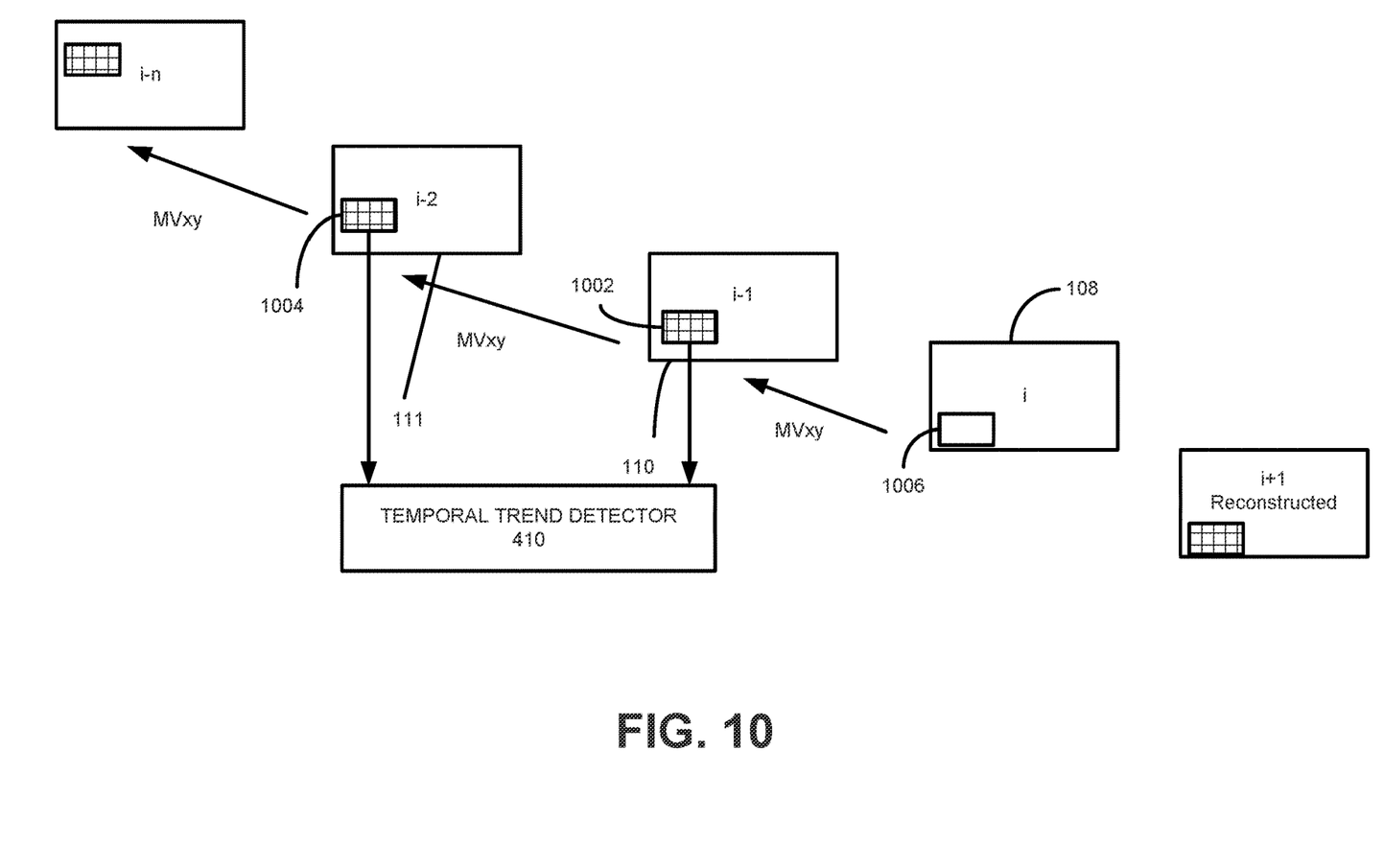
FIG. 10 diagrammatically illustrates temporal pixel intensity trend detection in accordance with one example set forth in the disclosure.

For example, referring also to FIG. 10, the inter-prediction detector 106 receives current frame 108 and multiple reconstructed frames 110 and 111 that are neighboring temporally such as multiple previous frames (and/or future frames). Any suitable number of frames may be employed. Also as used herein neighboring frames includes frames immediately adjacent in time or offset in time (e.g. every other frame or other suitable temporal offset). For example, the trend can be detected using any combination of available blocks, e.g., the trend can be obtained from the following blocks: i−5, i−4, i−1, i+7 etc. The curve fitting process takes the temporal distance into account to form a representative trend formula. In the example shown in FIG. 10, the temporal trend detector 410 compares pixel intensities for pixels that are in temporally adjacent frames for blocks 1002 and 1004 that are identified via the candidate motion vector. However, in other implementations, trend detection employs temporally adjacent frames that are both previous and future frames. Blocks 1002 and 1004 are reconstructed temporal neighbors of current block 1006, that are temporally neighboring blocks defined by the trajectory of the candidate motion vector (MVxy). For example, where a plane serves as an object that is tracked by motion vectors, the plane moving from one frame to another may have a lighter shading in one frame and darker shading in the next frame, and pixels between the temporally adjacent frames are compared for the moving block to determine if there is a pattern in pixel intensity differences for pixels that in blocks of each neighboring frame. With the shading assisted prediction, true motion can be captured, since the shading compensation will bias the selection process towards the direction of the motion.

The shading-assisted predication operation in some implementations does not replace regular (also referred to as standard) intra or inter prediction operations. It provides additional candidates to assess during an RDO process. Hence in some implementations, the predicted pixel or block will only be chosen when it has the smallest rate-distortion cost.

Figure 4:
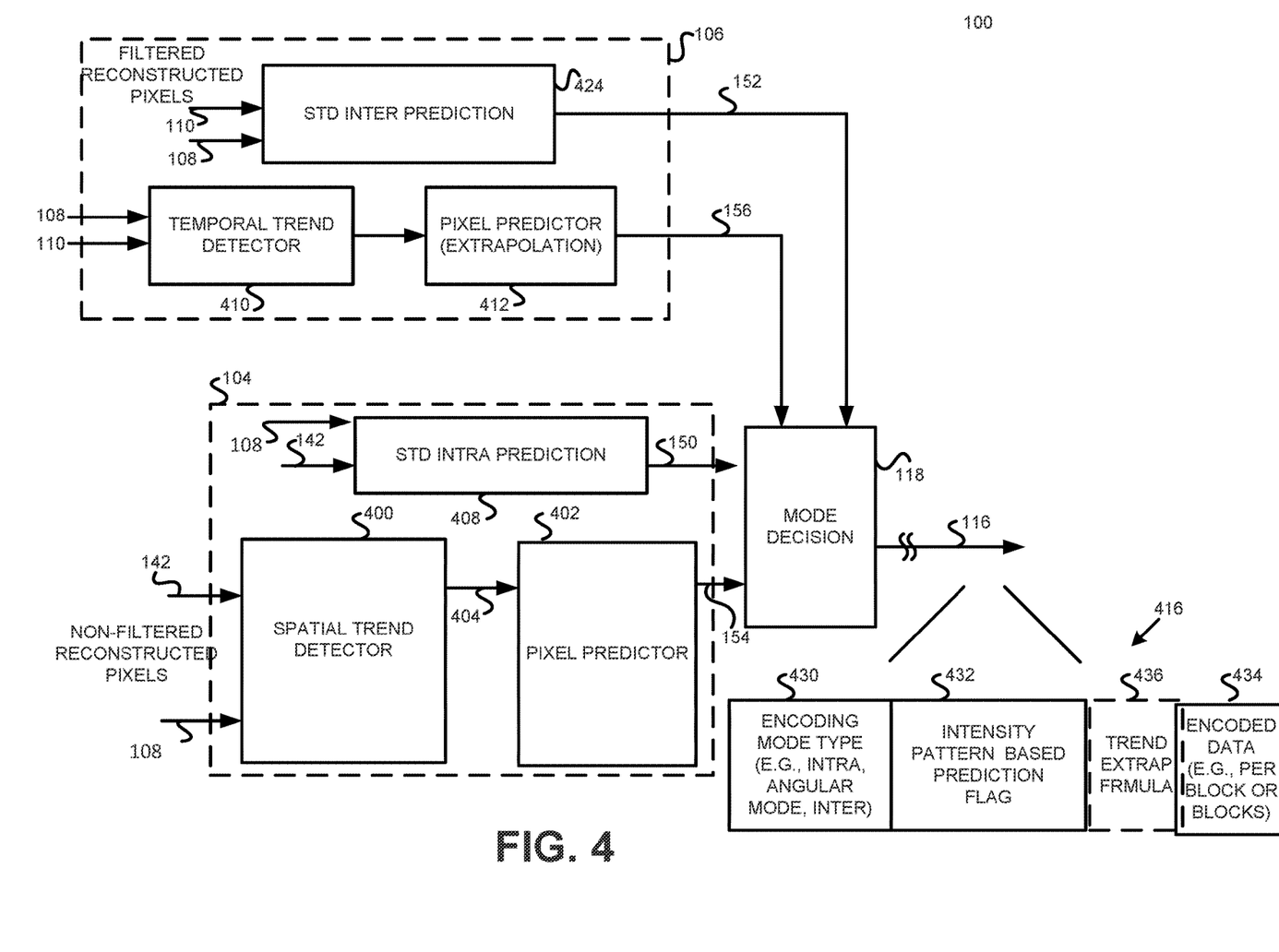
FIG. 4 is a block diagram of an apparatus for encoding one or more images in accordance with one example set forth in the disclosure.

FIG. 4 is a block diagram illustrating aspects of the encoding device 100. As shown in this example, the intra-prediction detector 104 includes a spatial trend detector 400 and pixel predictor 402. The spatial trend detector 400 receives the reconstructed pixels 142, such as non-filtered reconstructed pixels, and provides intensity trend data 404, such as projected points or extrapolated points along a trend line based on neighboring reconstructed pixels such as points A0 and A1 from FIG. 3. The pixel predictor 402 produces the predicted reconstructed pixels by extrapolating the trend data 404 and in this example, produces projected values P0, P1 and P2 to generate the predicted pixels C, D and E of FIG. 3. The intra-prediction detector 104 also includes a standard intra-prediction unit 408 that performs conventional intra-prediction pixel generation which are output as predicted pixels 150 to the mode decision unit 118 as with conventional systems.

The inter-prediction detector 106 includes a temporal trend detector 410 and a pixel predictor 412. The temporal trend detector 410 as noted above, while assessing a candidate motion vector and associated pixel blocks 1002 and 1004 among multiple neighboring frames, that represents the trajectory of motion to see if there is a pattern of pixel intensity differences, also referred to as a shading trend. If a trend is detected, a formula that represents the trend such as a linear formula or non-linear formula is applied during the inter-prediction process to generate predicted blocks based on the pattern of pixel intensity differences among blocks from temporally neighboring frames that are identified by the candidate motion vector. The trend can be formulated as a scaling and/or an offsetting operation as set forth above.

If a disruption of the projection process is observed due to sudden change in pixel values, the case is considered a different object (for intra prediction) or scene change (for inter prediction), and hence the projection process is limited to only legitimate pixels that represent a good reference. In other words, the mode decision unit 118 eliminates a subset of the neighboring pixels from the shading detection process if (for example) their intensity is significantly higher/lower than the surrounding trend, and hence it is considered an outlier.

In some implementations, the detected spatial pattern of pixel intensity differences is implicit and is determined by the encoder (and the decoder) by analyzing neighboring reconstructed pixels. In other implementations, the spatial pattern of pixel intensity differences is explicitly defined through shading parameters or data representing formulas that are provided and signaled into the bitstream to an encoder, such as by setting an "explicit" flag at the block level indicating that a formula is being sent with the encoded block.

The inter-prediction detector 106 also includes a conventional (standard) inter-prediction unit 424 that provides candidate temporal predicted blocks 152 for differing angular modes as known in the art. The bitstream data 416 in one implementation, is produced by the encoder to include encoding mode type data 430 such as data indicating whether a block is an intra-predicted block versus an inter-predicted block as well as data representing for the intra-predicted block type, the angular mode that has been used for that particular block. Data 432 is data that is output by the encoder in a bitstream indicating that an intensity difference pattern prediction operation was used in the encoding process for the block. This is referred to as an intensity pattern based prediction flag. The data encoded using the detected pattern of pixel intensity differences is shown as encoded data 434. In this example, the prediction of pixels is done in an implicit manner using the detected spatial or temporal pattern of pattern of pixel intensity differences such that the decoder will also include corresponding spatial or temporal trend detectors and pixel predictors as well as a reconstructed frame decoder so that the decoder can carry out the same operations as the encoder in terms of producing the reconstructed block.

In other examples, the bitstream includes data 436 representing the trend extrapolation formula so that the decoder need not implicitly determine the spatial pattern of pixel intensity differences that was employed by the encoder and instead is provided with the linear formula or best fit curve formula directly in the bitstream. This includes sending more data with each block so that there is a tradeoff between the complexity of decoder and bandwidth being used to communicate the encoded information.

Figure 5:
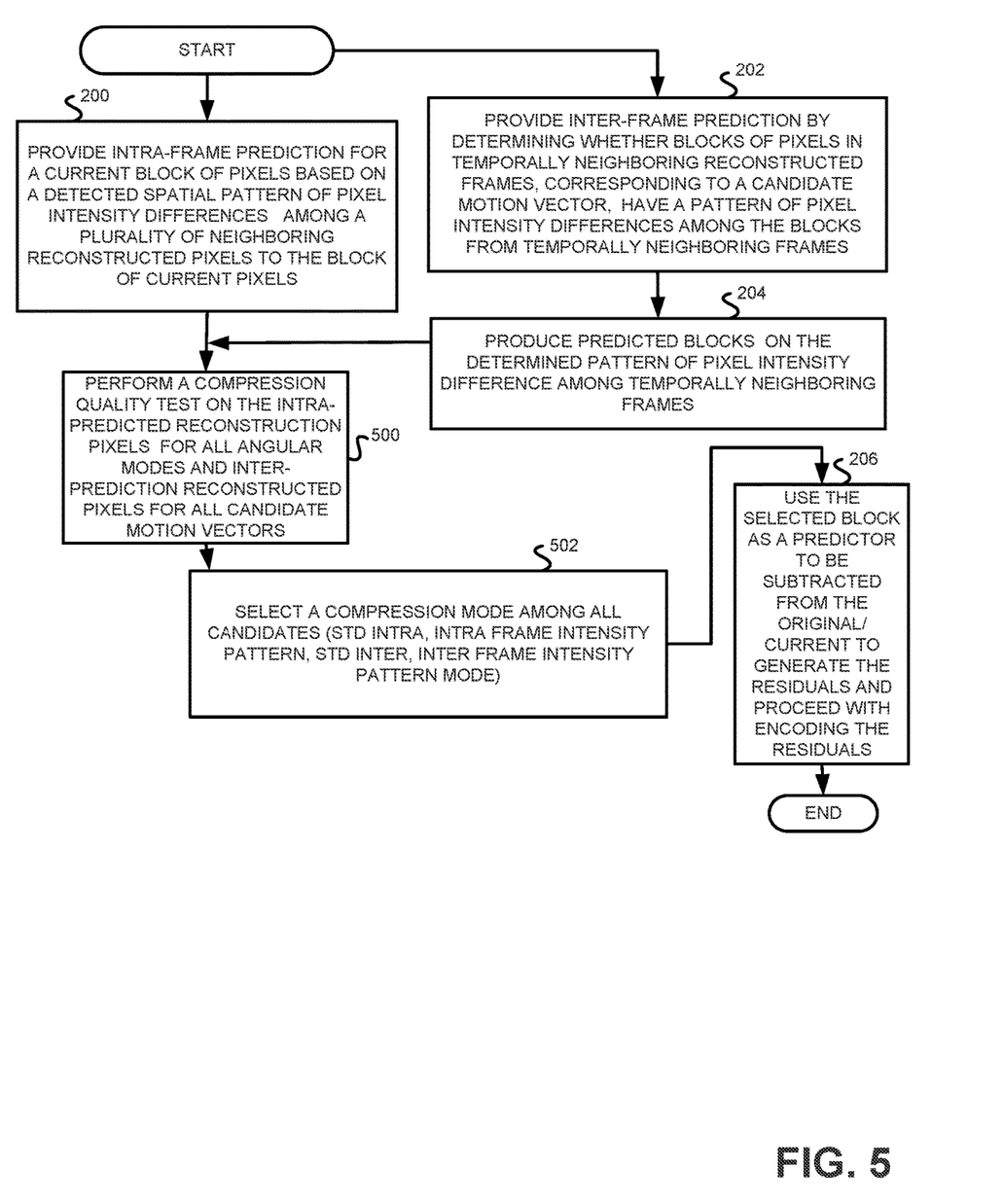
FIG. 5 is a flowchart illustrating a method for encoding one or more images in accordance with one example set forth in the disclosure.

FIG. 5 illustrates an example of a method for encoding an image frame according to one example. The method as shown includes both intra-prediction with spatial based intensity difference pattern detection and inter-prediction detection with temporal based intensity difference pattern detection. The method in one example is carried out by the system as shown in FIG. 1. As shown in block 500, the mode decision unit 118 performs a quality test on the intra-predicted reconstruction pixels 154 for all angular modes and the inter-prediction reconstructed pixels 156 for all candidate motion vectors that are provided by the detectors 104 and 106.

As shown in block 502, the method includes determining which of the predicted blocks 150, 152, 154 and 156 are a best candidate. In some implementations for the mode decision process the costs of all modes are compared against each other, and the lowest one is chosen.

For example, the mode decision unit 118 performs RDO analysis on all predicted blocks that are presented to it and outputs as the final candidate predicted block 128, the block with the best encoding characteristics. For example, if the intra or inter-frame intensity pattern difference detection based predicted blocks meet the quality threshold, the corresponding trend based compression mode is selected as the mode to use to encode the block from the current frame or if a standard inter-prediction or standard intra-prediction block is the best candidate one of them is chosen and as shown in block 206 the encoder encodes the block of pixels using the predicted block of reconstructed pixels by for example encoding the residuals resulting between the current block of pixels and the best candidate predicted block using any suitable encoding technique.

As such, the appropriate predicted block and mode is selected by the mode decision unit 118 as the final predicted mode to use for the block of interest from the current frame and the block is encoded as shown in 206 based on the prediction mode.

Figure 6:
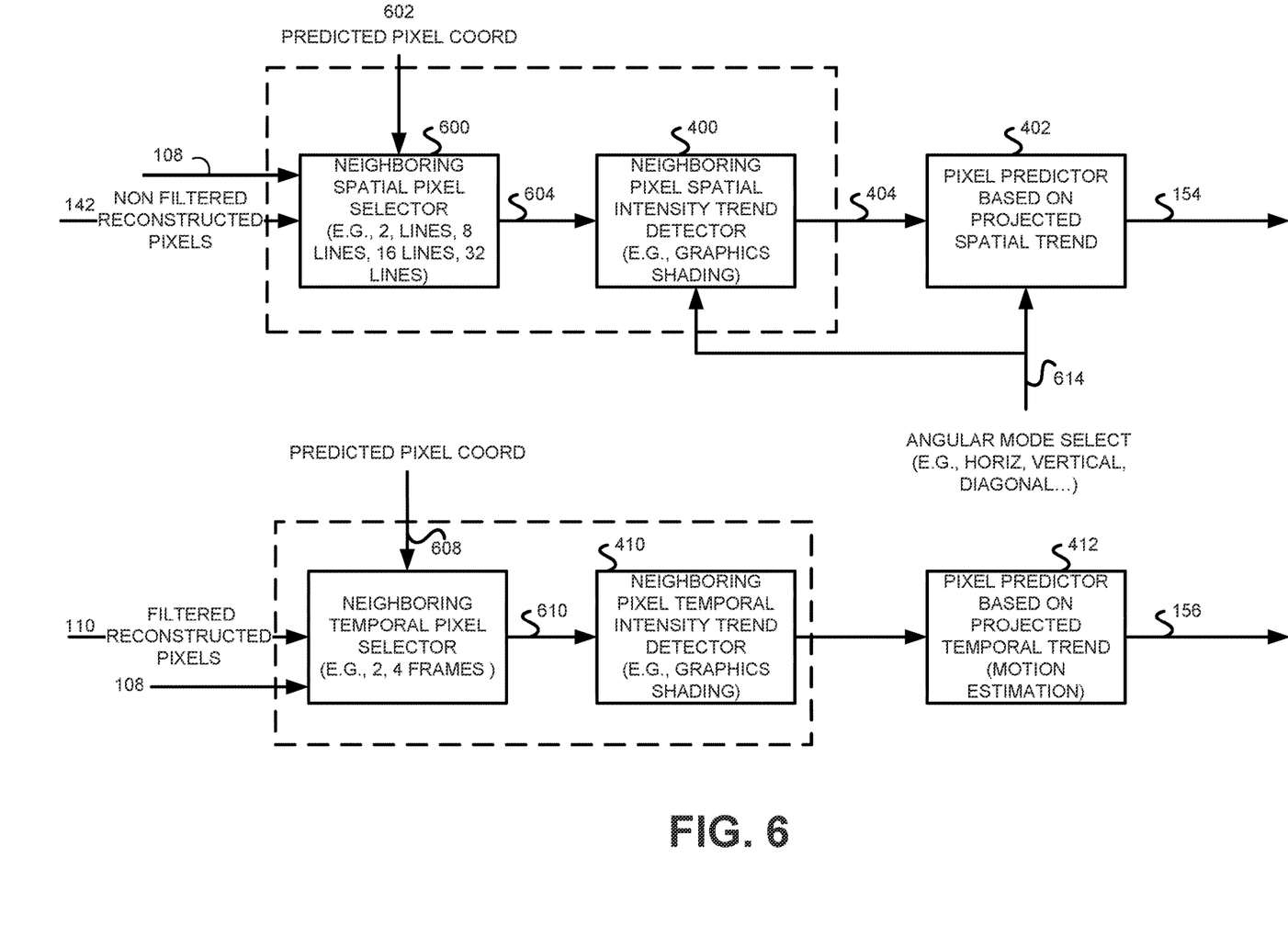
FIG. 6 is a block diagram of an apparatus for encoding one or more images in accordance with one example set forth in the disclosure.

FIG. 6 is a block diagram illustrating one example of aspects of the encoder 100. The intra-prediction detector 104 includes neighboring spatial pixel selector 600 which for example receives the pixel coordinate 602 of the neighboring lines in the appropriate angular mode and in some cases can include any suitable number of lines that are used to determine whether a pattern exists. For example, referring to FIG. 2, the predicted pixel coordinate information 602 includes the coordinate for pixels A and B and the corresponding pixel intensities 604 are provided to the neighboring pixel spatial intensity trend detector 400. The pixel intensities 604 can be stored in any suitable memory if desired. Similarly, the inter-prediction detector 106 also receives a predicted pixel coordinates 608 corresponding to pixel coordinates in temporally neighboring frames. Any suitable number of frames can be employed. The corresponding pixel intensities 610 are provided to the neighboring pixel temporal intensity trend detector 400 which attempts to determine whether a pattern exists by applying best fit curve analysis for example.

Also shown is angular mode select data 614 which is provided by the encoder to allow for predicted blocks to be generated for each angular mode as desired. For example, the encoder attempts to detect spatial patterns of pixel intensity information for blocks in each of a plurality of angular modes. The results if any are then output as candidate predicted blocks 154.

The encoding device can be implemented in a computing environment that includes multiple central processing (CPU) cores, multiple GPU cores or a hybrid multi-core, CPU/GPU system such as in a cloud server, laptop computer, desktop computer, handheld device, HD television or any suitable device. In some implementations, the encoder includes a processor executing firmware, in other implementations the encoder is implemented by the GPU with driver and API communication with an operating system as known in the art. In other implementations, the encoder is implemented as discrete logic including one or more state machines, program processors, field programmable gate arrays, or any suitable combination of processors executing software in combination with hardware logic.

Figure 7:
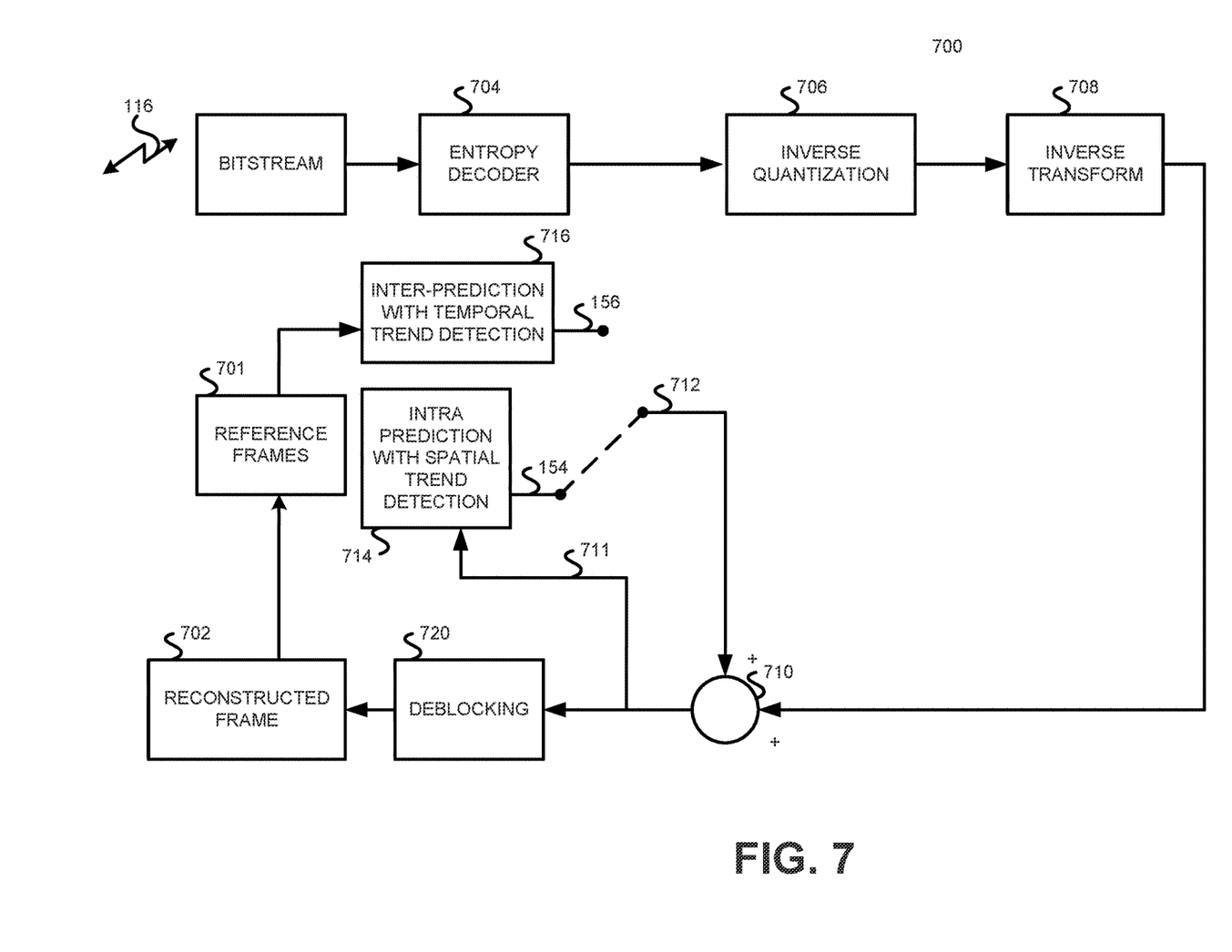
FIG. 7 is a block diagram illustrating a decoding device for decoding one or more image frames in accordance with one example set forth in the disclosure.

FIG. 7 is a block diagram illustrating one example of a decoder 700 that attempts to perform implicit detection of spatial pattern of pixel intensity differences from reference frames or reconstructed frames 701 and 712. The decoder 700 receives the encoded data 116 as a bitstream and in this example, receives the data 416. The encoded data is passed through an entropy decoder 704 an inverse quantization stage 706 and inverse transform stage 708 and provided to a combiner 710 as known in the art. The encoding mode type data 430 informs the decoder as to whether to select 712 intra-frame decoding or inter-frame decoding as well as the angular mode for decoding intra-predicted pixels or motion vector for inter-predicted pixels. The data 432 informs the decoder that the decoder must undergo spatial/temporal pattern of pixel intensity difference detection since the encoded block has been encoded using this type of prediction. In some implementations, the information 416 is provided on a per block basis. As such, as a block is being decoded, the decoder selects the appropriate intra-prediction or inter-prediction spatial/temporal pattern pixel intensity difference detectors 714 and 716 which are similar to the intra-prediction detector 104 and inter-prediction detector 106 in operation. The decoder includes a deblocking stage 720 as known in the art to provide filtering.

As such, the decoder includes similar spatial trend and temporal trend detection logic. If a flag bit 432 relating to the intensity pattern based prediction flag is set on a per-block basis (which includes groups of blocks) the decoder detects the trend and performs the extrapolation from reconstructed pixels 711. The intensity pattern based prediction flag 432 in some examples indicates whether a neighboring temporal trend detection should be used on a particular encoded block or if a spatial pattern of pixel intensity differences detection should be performed on a particular block. In some implementations, the spatial trend detector 400, pixel predictor 402, the temporal trend detector 410 and pixel predictor 412 are duplicated as corresponding units in the decoder.

Figure 8:
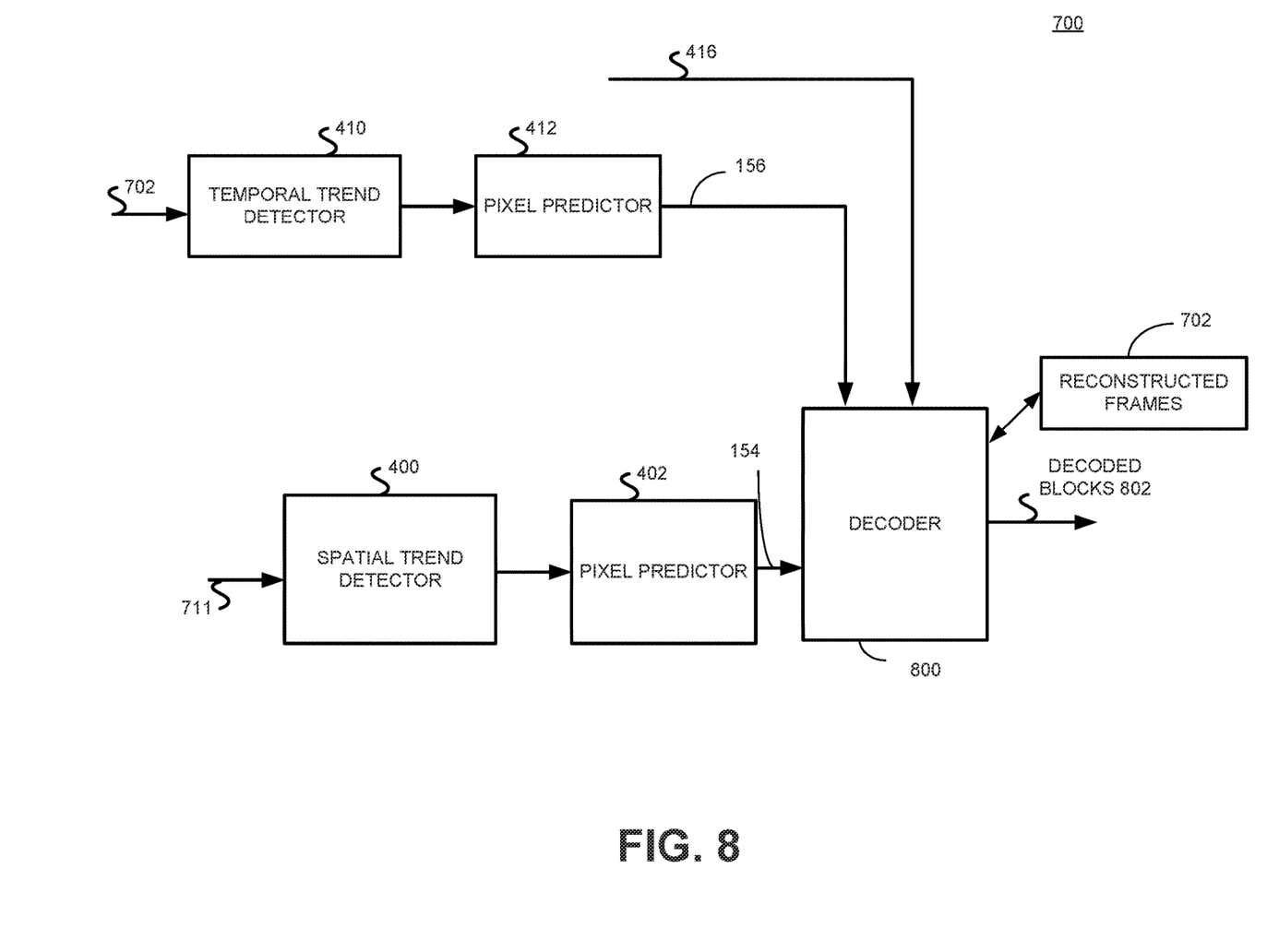
FIG. 8 is a block diagram illustrating a decoding device for decoding one or more image frames in accordance with one example set forth in the disclosure.

FIG. 8 is a block diagram illustrating one example of the decoder 700 that includes a spatial trend detector 400, pixel predictor 402, temporal trend detector 410, pixel predictor 412 and a decoder unit 800 that produces decoded blocks 802 using reconstructed frames 702 and the predicted blocks 154/156 to produce decoded blocks 802. The decoder performs the corresponding same operations as the encoder as needed. For example, it will be recognized that the decoder need not perform angular mode predictions and choose among them since the decoder need only perform spatial trend detection for the angular mode signaled by the encoder in the bitstream. Similarly, the decoder performs temporal trend detection for only one motion vector (the one that the encoder chose and signaled into the bitstream).

In certain implementations, the decoder 700 performs inter-prediction-based decoding by generating reconstructed temporally neighboring frames corresponding to a motion vector as reconstructed frames 702 and also performs intra-prediction based decoding on encoded blocks that were encoded using spatial intensity pattern differences by the encoder 100. For inter-prediction encoded blocks, the decoder determines whether blocks of pixels in the temporally neighboring reconstructed frames correspond to a motion vector that in some implementations is provided as information 416 for a block to determine if the blocks have a pattern of pixel intensity differences among the blocks from the temporally neighboring frames, in a similar manner as the encoder. The decoder produces the predicted blocks 156 for a reconstructed frame based on the determined pattern of pixel intensity differences.

In some implementations, the decoding device 700 includes a block-based decoder that receives a stream of encoded video 116 and decodes an encoded block of pixels that is encoded using a predicted block of reconstructed pixels that is predicted based on a detected spatial pattern of pixel intensity differences from neighboring reconstructed pixels in a reconstructed frame and/or predicted based on detected temporal patterns of reconstructed blocks among temporally neighboring frames.

In this example, the block-based decoder receives data 432 (e.g., on a per block, per group of blocks, per slice or per frame as desired) indicating that a spatial pattern of pixel intensity differences was used to encode a block or blocks of the encoded video, and decodes the encoded block of pixels based on the data. For example, when the data 430 and 432 indicates an intra-prediction trend based mode was used for a block, the block-based decoder performs intra-prediction based decoding by generating at least one reconstructed frame from the stream of encoded video, predicts pixels for a decoded block of reconstructed pixels based on a detected spatial pattern of pixel intensity differences among a plurality of neighboring reconstructed pixels in the reconstructed frame of a reconstructed frame in a spatial direction that is identified by a decoded intra-prediction mode using the intra-prediction detector 714 and in particular the spatial trend detector 400 and pixel predictor 402 in the decoder, and outputs the decoded block 802 that includes the predicted pixels. The predicted pixel is added with the residual data sent by the encoder to generate the reconstructed pixel.

When the data 430 and 432 indicate that the block was encoded using interframe prediction and using temporal trend prediction, the decoder performs inter-prediction based decoding by generating a plurality of reconstructed temporally neighboring frames corresponding to a motion vector for the block and determining whether blocks of pixels in the temporally neighboring reconstructed frames corresponding to the motion vector have a pattern of pixel intensity differences among the blocks from temporally neighboring frames using the inter-prediction detector 716 and in particular the temporal trend detector 410 and pixel predictor 412. The decoder produces predicted blocks for a reconstructed frame based on the determined pattern of pixel intensity difference among temporally neighboring frames.

In certain examples, the block-based decoder performs a best fit curve analysis on differences among the neighboring reconstructed pixels and apply the determined best fit curve to predict pixel intensities for pixels in the predicted block of reconstructed pixels. In some examples, the block-based decoder detects linear pixel intensity differences among the plurality of neighboring reconstructed pixels for a plurality of differing angular prediction modes and apply the detected linear differences to predict pixels for the block of reconstructed pixels. In certain examples, the block-based decoder receives data in the encoded video indicating a type of pixel intensity difference pattern, such as formula defining the pattern that was used to encode data, and uses the indicated type of pixel intensity difference pattern for prediction of pixel data in a reconstructed frame when decoding the encoded video.

In some implementations, the decoder tests all possible models until it finds the most descriptive one (like the encoder). In other implementations, bits are sent in the bit stream to the decoder to signal in the bitstream the model that was used (e.g., linear), so that the decoder does not have to do a lot of compute for all possible models. This model type is different than the model parameters. The model parameters can be either explicit (parameters sent in the bitstream), or implicit (decoder calculates it the same way encoder did). In contrast to some prior systems in some implementations, different sets of pixels are used to calculate the temporal trending model such as corresponding blocks of pixels that correspond to the trajectory of the motion vector for the candidate block of pixels to be predicted—as opposed to using spatially adjacent pixels to the candidate block and corresponding spatially located pixels to a temporal block corresponding to the candidate block to be predicted. Also, unlike some other systems, the disclosed prediction process is scalable with block size so that eh the size of the pixels blocks used for trend derivation can scale with the size of compute units. It will be recognized that subsampled version of pixels can be used to determine trends as well.

Figure 9:
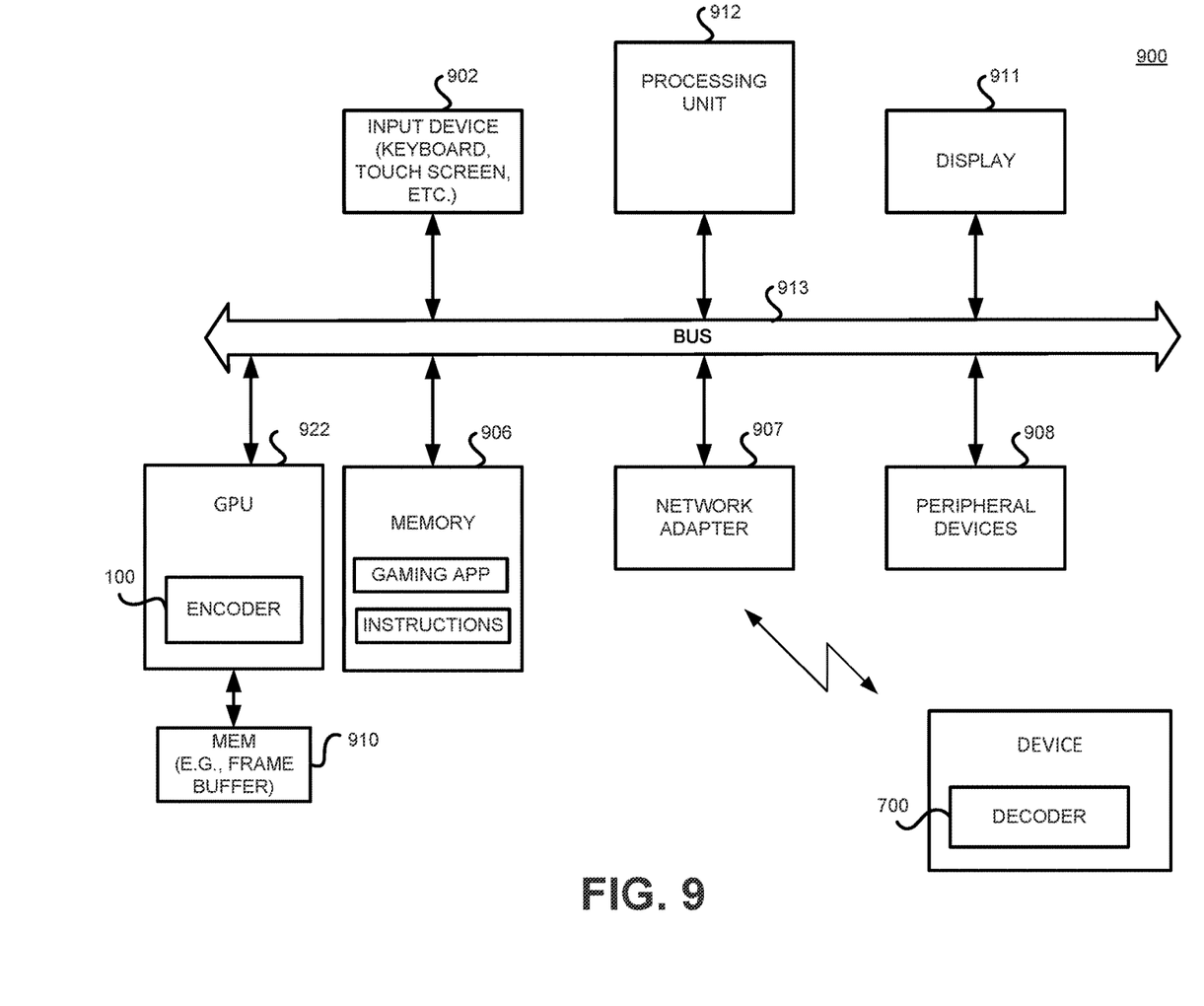
FIG. 9 is a block diagram of a system for encoding and decoding one or more images in accordance with one example set forth in the disclosure.

FIG. 9 illustrates an embodiment of a computing system 900 such as a cloud platform that provides encoded video. In this example the system uses GPU 922 and associated drivers to provide the encoder 100 as described herein. In general, the computing system 900 is embodied as any of a number of different types of devices, including but not limited one or more cloud servers, or other devices that includes a CPU 912, GPU 922 and memory 906 and may be a system on-chip, integrated circuits, multipackage device etc. In this example, the computing system 900 includes a number of components that communicate with each other through a bus structure 913. In computing system 900, each of the components is capable of communicating with any of the other components either directly through the bus 913, or via one or more of the other components. The components in computing system 900 in some implementations are contained within a single physical enclosure, such as a server chassis, laptop or desktop chassis, or a mobile phone casing or in some implementations the display is remote from a system on-chip or other configuration. In alternative embodiments, some of the components of computing system 900 are embodied as peripheral devices 908 such that the entire computing system 900 does not reside within a single physical enclosure.

In some implementations, the computing system 900 also includes user interface devices for receiving information from or providing information to a user. Specifically, the computing system 900 includes an input device 902, such as a keyboard, mouse, touch-screen, or other device for receiving information from the user. The computing system 900 in some implementations displays information to the user via a physical monitor 911, such as light-emitting diode (LED) display, liquid crystal display, or other output device. However, such devices need not be employed. The GPU uses frame buffer memory 910 to store frames of created graphics images or other image data for encoding by the encoder.

In certain implementations, computing system 900 additionally includes a network adapter 907 for transmitting and receiving data over a wired or wireless network to a device that includes a decoder 700. The device can be any suitable device. Computing system 900 also includes one or more peripheral devices 908. The peripheral devices 908 may include mass storage devices, location detection devices, sensors, input devices, or other types of devices used by the computing system 900.

The processing unit 912 receives and executes instructions that are stored in a memory system 906 such as gaming applications or other applications. In one embodiment, the processing unit 912 includes multiple processing cores that reside on a common integrated circuit substrate. Memory system 906 includes memory devices used by the computing system 900, such as random-access memory (RAM) modules, read-only memory (ROM) modules, hard disks, and other non-transitory computer-readable media. Some of the memory devices are used as memory 906 for the processing unit 912.

Some embodiments of computing system 900 may include fewer or more components than the embodiment as illustrated in FIG. 9. For example, certain embodiments are implemented without any display 911 or input devices 902. Other embodiments have more than one of a particular component, for example, an embodiment of computing system 900 could have multiple processing units 912, buses, network adapters 907, memory systems 906, etc.

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method in an encoding device for encoding at least one image frame, the method comprising:
   providing inter-frame prediction by generating an inter-frame predicted block from reconstructed pixels for a block of current pixels, by predicting pixel intensities for pixels in the inter-frame predicted block based on a detected temporal pattern of pixel intensity differences among temporal blocks of pixels in temporally neighboring reconstructed frames corresponding to a candidate motion vector of the block of current pixels; and
   encoding the block of current pixels of the at least one image frame using the inter-frame predicted block of reconstructed pixels.

2. The method of claim 1 comprising:
   perform a compression quality test on an intra-frame predicted block from reconstruction pixels and on inter-prediction reconstructed pixels of the inter-frame predicted block of pixels; and
   based on the compression quality test, select a compression mode that uses at least one of the intra-frame predicted block from reconstructed pixels or inter-predicted reconstructed pixel to encode a block of pixels in the at least one image frame.

3. The method of claim 1 comprising outputting data for a decoder indicating that an intensity difference pattern prediction operation was used to encode the block of current pixels.

4. The method of claim 1 comprising performing a best fit curve analysis on differences among a plurality of temporally neighboring reconstructed pixels and applying a best fit curve to predict pixel intensities for pixels in the inter-frame predicted block of reconstructed pixels, wherein the best fit curve analysis includes detecting linear pixel intensity differences among the plurality of temporally neighboring reconstructed pixels for a plurality of differing angular prediction modes.

5. An apparatus for encoding at least one image frame comprising:
   a block-based predictor operative to provide inter-frame prediction by:
      generating an inter-frame predicted block of reconstructed pixels for a block of current pixels, by predicting pixel intensities for pixels in the inter-frame predicted block based on a detected temporal pattern of pixel intensity differences among a plurality of temporally neighboring reconstructed pixels to the block of current pixels; and
      encoding a block of pixels of the at least one image frame using the inter-frame predicted block of reconstructed pixels.

6. The apparatus of claim 5 wherein the block-based predictor is operative to perform a best fit curve analysis on differences among the plurality of temporally neighboring reconstructed pixels and apply a determined best fit curve to predict pixel intensities for pixels in the inter-frame predicted block of reconstructed pixels.

7. The apparatus of claim 5 the block-based predictor is operative to detect linear pixel intensity differences among the plurality of temporally neighboring reconstructed pixels for a plurality of differing angular prediction modes and apply the detected linear pixel intensity differences to predict pixels for the block of reconstructed pixels.

8. The apparatus of claim 6 wherein the block-based predictor comprises a compression mode determinator that is operative to:
perform a compression quality test on the inter-frame predicted block of reconstruction pixels as compared to predicted pixels from other prediction modes; and
based on the compression quality test, select a compression mode that uses the inter-frame predicted block of reconstructed pixels to encode a block of pixels in the frame.

9. The apparatus of claim 5 comprising an encoder operative to encode blocks of the at least one image frame using the predicted blocks.

10. The apparatus of claim 5 wherein the block-based predictor comprises a compression mode determinator that is operative to:
perform a compression quality test on the inter-frame predicted block from reconstruction pixels and inter-prediction reconstructed pixels; and
based on the compression quality test, select a compression mode that uses at least one of the inter-frame predicted block from reconstructed pixels or inter-predicted reconstructed pixel to encode a block of pixels in the at least one image frame.

11. The apparatus of claim 10 wherein the encoder is operative to output data for a decoder indicating that an intensity difference pattern prediction operation was used to encode the block of current pixels.

12. An apparatus for decoding an encoded image frame comprising:
a block-based decoder operative to:
receive a stream of encoded video; and
decode an encoded block of pixels that is encoded using a predicted block of reconstructed pixels that includes predicted pixel intensities for pixels in the predicted block based on a detected temporal pattern of pixel intensity differences from temporally neighboring reconstructed pixels.

13. The apparatus of claim 12 wherein the block-based decoder is operative to:
receive data indicating that a temporal pattern of pixel intensity differences was used to encode the encoded video; and
decode the encoded block of pixels based on the data.

14. The apparatus of claim 13 wherein the block-based decoder is operative to perform inter frame prediction based decoding by:
predicting pixels for a decoded block of reconstructed pixels, based on a detected temporal 1 pattern of pixel intensity differences among a plurality of temporally neighboring reconstructed pixels of a reconstructed frame in a temporal direction that is identified by a decoded inter-frame prediction mode; and
outputting the decoded block.

15. The apparatus of claim 14 wherein the block-based decoder is further operative to perform inter-frame prediction based decoding by:
generating a plurality of reconstructed temporally neighboring frames corresponding to a motion vector;
determining whether blocks of pixels in the plurality of reconstructed temporally neighboring frames corresponding to the motion vector have a pattern of pixel intensity differences among the blocks from temporally neighboring frames; and
producing predicted blocks for a reconstructed frame based on the determined pattern of pixel intensity difference among temporally neighboring frames in a temporal direction that is identified by a decoded motion vector.

16. The apparatus of claim 15 wherein the block-based decoder is operative to perform a best fit curve analysis on differences among the neighboring reconstructed pixels and apply a best fit curve to predict pixel intensities for pixels in the predicted block of reconstructed pixels.

17. The apparatus of claim 15 wherein the block-based decoder is operative to detect linear pixel intensity differences among the plurality of neighboring reconstructed pixels for a plurality of differing angular prediction modes and apply the detected linear pixel intensity differences to predict pixels for a block of reconstructed pixels.

18. The apparatus of claim 15 wherein the block-based decoder is operative to:
receive data in the encoded video indicating a type of pixel intensity difference pattern that was used to encode data; and
use the indicated type of pixel intensity difference pattern for prediction of pixel data in a reconstructed frame when decoding the encoded video.

* * * * *